United States Patent
Henson et al.

(10) Patent No.: US 7,278,119 B2
(45) Date of Patent: Oct. 2, 2007

(54) BATTERY-OPTIMIZED SYSTEM-ON-A-CHIP AND APPLICATIONS THEREOF

(75) Inventors: Matthew Brady Henson, Austin, TX (US); Matthew D. Felder, Austin, TX (US); Marcus W. May, Austin, TX (US); Daniel Mulligan, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 666 days.

(21) Appl. No.: 10/612,577

(22) Filed: Jul. 2, 2003

(65) Prior Publication Data

US 2004/0107407 A1 Jun. 3, 2004

Related U.S. Application Data (60) Provisional application No. 60/429,941, filed on Nov. 29, 2002.

(51) Int. Cl.
*G06F 17/50* (2006.01)
(52) U.S. Cl. .............................................. 716/2; 716/1
(58) Field of Classification Search .................... 716/1, 716/2, 18
See application file for complete search history.

(56) References Cited

U.S. PATENT DOCUMENTS

| | | | | |
|---|---|---|---|---|
| 6,204,651 | B1 * | 3/2001 | Marcus et al. | 323/283 |
| 6,853,171 | B2 * | 2/2005 | May | 323/283 |
| 2004/0104707 | A1 * | 6/2004 | May et al. | 320/136 |

* cited by examiner

*Primary Examiner*—Paul Dinh
*Assistant Examiner*—Binh Tat
(74) *Attorney, Agent, or Firm*—Garlick Harrison & Markison; William W. Kidd; Bruce E. Stuckman (57) ABSTRACT

A battery-optimized system-on-a-chip includes multimedia module, a high-speed interface, a processing module, on-chip memory, and an on-chip DC-to-DC converter. The multimedia module operably coupled to produce rendered output data from input data received via the high-speed interface and/or from data stored in the on-chip memory. The high-speed interface is operably coupled to provide data to and from an external source. The on-chip memory is operably coupled to store at least a portion of a multimedia application, wherein the processing module processes input multimedia data in accordance with the multimedia application to produce output multimedia data. The on-chip DC-to-DC converter is operably coupled to convert a battery voltage into a supply voltage that is provided to the multimedia module, the high-speed interface, the processing module, and/or the on-chip memory.

46 Claims, 7 Drawing Sheets

FIG. 1

FIG. 2
multiple function battery operated device 60

FIG.3 battery-optimized system-on-chip 100

FIG. 4
comprehensive system-on-a-chip 120

FIG. 5: battery-optimized system-on-a-chip 140

FIG. 6
capacitor-less headphone driver 72

FIG. 7
capacitor-less headphone driver 72

FIG. 8
EL backlighting drive circuitry 70

BATTERY-OPTIMIZED SYSTEM-ON-A-CHIP AND APPLICATIONS THEREOF

CROSS REFERENCE TO RELATED PATENTS

This patent is claiming priority under 35 USC § 119(e) to provisionally filed patent application entitled MULTI-FUNCTION HANDHELD DEVICE, having a provisional Ser. No. of 60/429,941 and a provisional filing date of Nov. 29, 2002.

BACKGROUND OF THE INVENTION

1. Technical Field of the Invention

This invention relates generally to portable electronic equipment and more particularly to a multi-function handheld device and a battery-optimized system-on-a-chip used therein.

2. Description of Related Art

As is known, integrated circuits are used in a wide variety of electronic equipment, including portable, or handheld, devices. Such handheld devices include personal digital assistants (PDA), CD players MP3 players, DVD players, AM/FM radio, digital still cameras, digital video cameras, pagers, cellular telephones, computer memory extension (commonly referred to as thumb drives), etc. Each of these handheld devices includes one or more integrated circuits to provide the functionality of the device. For example, a thumb drive may include an integrated circuit for interfacing with a computer (e.g., personal computer, laptop, server, workstation, etc.) via one of the ports of the computer (e.g., Universal Serial Bus, parallel port, etc.) and at least one other memory integrated circuit (e.g., flash memory). As such, when the thumb drive is coupled to a computer, data can be read from and written to the memory of the thumb drive. Accordingly, a user may store personalized information (e.g., presentations, Internet access account information, etc.) on his/her thumb drive and use any computer to access the information.

As another example, an MP3 player may include multiple integrated circuits to support the storage and playback of digitally formatted audio (e.g., formatted in accordance with the MP3 specification). As is known, one integrated circuit may be used for interfacing with a computer, another integrated circuit for generating a power supply voltage, another for processing the storage and/or playback of the digitally formatted audio data, and still another for rendering the playback of the digitally formatted audio data audible.

Integrated circuits have enabled the creation of a plethora of handheld devices, however, to be "wired" in today's electronic world, a person needs to posses multiple handheld devices. For example, one may own a cellular telephone for cellular telephone service, a PDA for scheduling, address book, etc., one or more thumb drives for extended memory functionality, an MP3 player for storage and/or playback of digitally recorded music, a radio, etc. Thus, even though a single handheld device may be relatively small, carrying multiple handheld devices on one's person can become quite burdensome.

Further, such handheld devices use a battery (or batteries) to supply power to the circuitry of the device. The more power the circuitry consumes, the shorter the battery life (i.e., how long the device can be operated before having to replace or charge the battery). Several techniques have been developed to reduce power consumption of battery-powered circuitry. One technique is to turn off circuitry that is not needed to support the present function and to put the device in a "sleep" mode when the entire device is not in use. Another technique relates to improvements in integrated circuit fabrication, which allow for smaller devices to be developed and to operating at lower voltages, thus consuming less power. For example, 0.18 micron CMOS integrated circuit technology is currently the most popular process, which uses supply voltages of 1.8 volts. Just a few years ago, however, 0.35 micron and 0.50 micron CMOS IC technology were the most popular processes, which used supply voltages of about 3.3 volts. In the near future, 0.09 and 0.13 micron CMOS IC technology will most likely become the technology of choice, which use supply voltages of about 1.0 volts. While these techniques work to reduce power consumption, they are not optimized on a chip-by-chip basis, but are designed based on worst-case operation of the integrated circuit. As such, a majority of the integrated circuit circuits are consuming more power than necessary, since the power reducing techniques are worst-case based and not individually established.

Yet further, many handheld devices include an external memory interface to couple to external memory, such as a memory card, flash memory, etc. The memory interface typically includes a state machine that is programmed to process the reading to and writing from the external memory in accordance with a standardized memory access protocol. As is known, many external memory devices use a standardized memory access protocol, however, recently some manufacturers have deviating from the standardized memory access protocol. The non-standard external memories offer some advantages over the standardized memories, thus are desirable for use with the handheld devices. However, the memory interface state machine is not capable of processing the memory access requests for non-standard memory. Thus, a handheld device would require multiple state machines to process memory access requests with standard and non-standard memories.

Therefore, a need exists for an integrated circuit that provides multiple functions for handheld devices with optimized power consumption, with a minimal requirement of external components, and provides flexible external memory interfacing.

BRIEF SUMMARY OF THE INVENTION

The battery-optimized system-on-a-chip of the present invention substantially meets these needs and others. In one embodiment, a battery-optimized system-on-a-chip includes multimedia module, a high speed interface, a processing module, on-chip memory, and an on-chip DC-to-DC converter. The multimedia module is operably coupled to produce rendered output data from input data received via the high-speed interface or from data stored in the on-chip memory. The multimedia data includes audio, video, video graphics, and/or text data. The high-speed interface is operably coupled to provide data to and from an external source, such as a host computer, video decoder, memory card, wireless modem, and/or a CMOS/CCD (charge coupled device) image sensor. The on-chip memory is operably coupled to store at least a portion of a multimedia application, wherein the processing module processes input multimedia data in accordance with at least a portion of the multimedia application to produce output multimedia data, wherein the input multimedia data is received from the multimedia module and/or the high-speed interface, and wherein the output multimedia data is provided to the multimedia module and/or the high-speed interface. The on-chip DC-to-DC converter is operably coupled to convert a battery voltage into a supply voltage, wherein the DC-to-DC converter provides the supply voltage to at least one of the multimedia module, the high-speed interface, the processing module, and the on-chip memory. With such a system-on-a-chip, power consumption is optimized for various applications within handheld battery operated devices requiring a minimal of external components.

In another embodiment, a comprehensive system-on-a-chip includes a processing core, digital interface circuitry, mixed signal circuitry, and battery optimization/management circuitry (hereinafter referred to as battery optimization circuitry). The processing core is operably coupled to process input digital data and produce therefrom output digital data. The digital interface circuitry is operably coupled to provide the input digital data to the processing core and to receive the output digital data from the processing core. The mixed signal circuitry operably coupled to convert input analog signals into at least some of the input digital data and to convert at least some of the output digital data into output analog signals. The battery optimization circuitry includes a DC-to-DC converter and a battery charger, wherein the DC-to-DC converter is operably coupled to convert a battery voltage into a supply voltage that supplies at least one of the processing core, the digital interface circuitry, and the mixed signal circuitry and the battery charger is operably coupled to charge a battery that generates the battery voltage. With such a system-on-a-chip, power consumption is optimized for various applications within handheld battery operated devices requiring a minimal of external components.

DETAILED DESCRIPTION OF THE INVENTION

Figure 1:
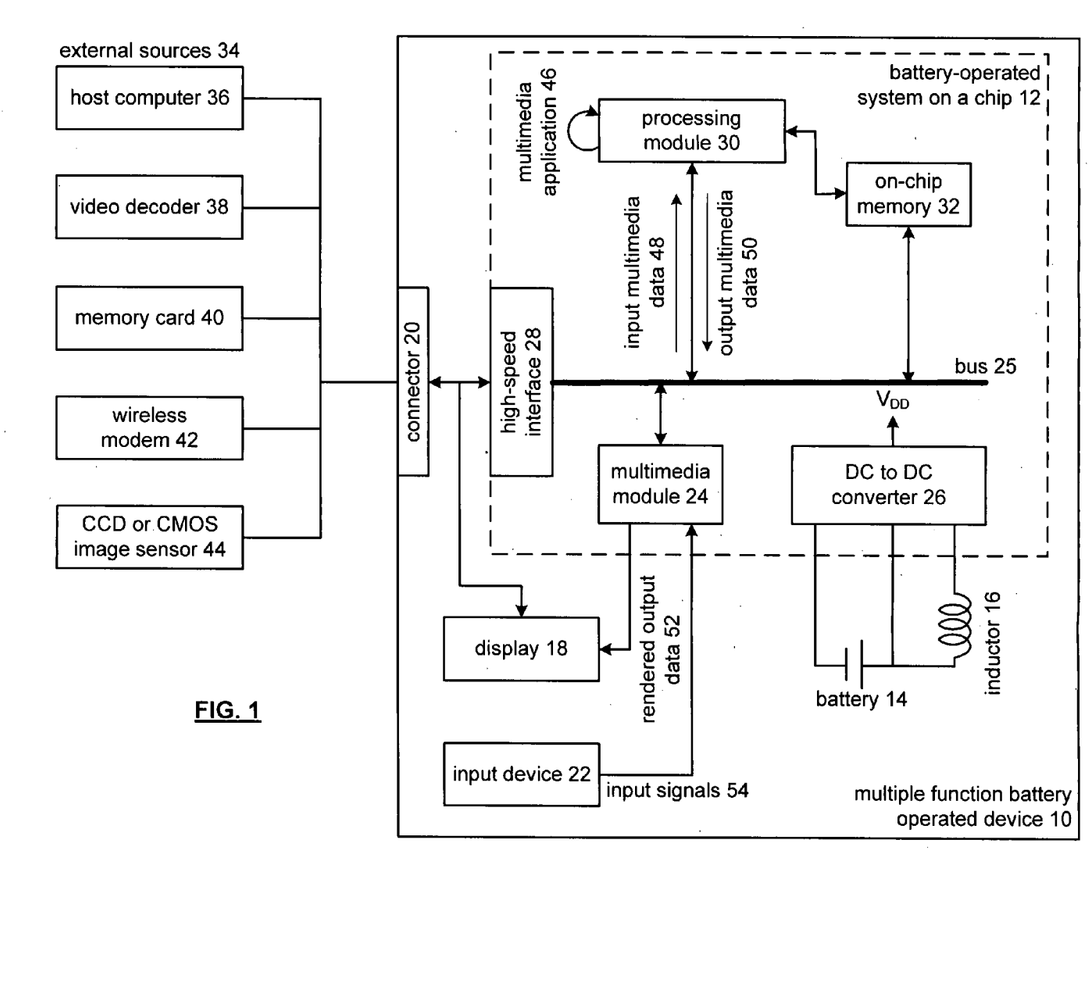
FIG. 1 is a schematic block diagram of a multiple function battery operated device that includes a battery-optimized system-on-a-chip in accordance with the present invention.

FIG. 1 is a schematic block diagram of a multiple function battery operated device 10 that includes a battery-optimized system-on-a-chip 12, a battery 14, an inductor 16, a display 18, a connector 20, and an input device 22. The connector 20 provides coupling between the battery-optimized system-on-a-chip 12 and an external source 34, which may be a host computer 36, a video decoder 38, a memory card 40, a wireless modem 42, a CMOS/CCD image sensor 44. The battery-optimized system-on-a-chip 12 includes a multimedia module 24, a high-speed interface 28, a processing module 30, on-chip memory 32, and an on-chip DC-to-DC converter 26. In general, the multiple function battery operated device 10 may be, but is not limited to, an MP3 player/recorder, a thumb drive memory extension, a digital camera, a digital camcorder, a DVD player/recorder, video conferencing device, a personal digital assistant (PDA), a radio, a television, and/or a CD player/recorder.

The DC-to-DC converter 26 is operably coupled to the battery 14 and inductor 16 to produce at least one supply voltage, ($V_{DD}$). In general, the DC-to-DC converter may be a buck converter, a boost converter, a fly-back converter, a half-bridge converter, and/or a full bridge converter. In one embodiment, the DC-to-DC converter is a boost converter that includes a sink transistor, at least one load transistor, and regulation circuitry. The regulation circuitry monitors the supply voltage ($V_{DD}$) with respect to a reference voltage and produces therefrom a regulation signal. The regulation signal, in one phase, enables the sink transistor to build up energy in the inductor and, in another phase, enables the load transistor to transfer the energy of the inductor to the supply voltage. The DC-to-DC converter 26 may be constructed in accordance with the teaching of U.S. Pat. No. 6,204,651, entitled METHOD AND APPARATUS FOR REGULATING A DC VOLTAGE and provides the supply voltage the processing module 30, the on-chip memory 32, the high-speed interface 28, and/or the multimedia module 24. The DC-to-DC converter 26 may also provide the supply voltage off-chip to power the display 18 and/or the input device 22.

The high-speed interface 28 is operably coupled to bus 25 within the system-on-a-chip 12 and externally to the connector 20. As such, the hi may be a USB (universal serial bus) interface, a serial interface, a serial-to-deserial interface, or parallel interface, provides connectivity between one or more external sources 34 and the system-on-a-chip 12. For example, the host computer 36, which may be a personal computer, laptop, workstation etc., provides digitized audio (e.g., an MP3 file, WMA—Windows Media Architecture—mp3PRO, Ogg Vorbis, AAC—Advanced Audio Coding (WAV), a CD file, etc.) and/or digitized video signals (e.g., an MPEG (motion picture expert group) file, a JPEG (joint photographic expert group) file, a DVD file, a video graphics file, a text file, etc.) to the high-speed interface 28. The high-speed interface 28 converts the format of the received data into a generic format of the system-on-a-chip, which is based on the type of processing module 30 and/or the type of on-chip memory 32. The high-speed interface then provides the generic formatted data to the processing module 30, the on-chip memory 32 and/or the multimedia module 24.

For instance, the digitalized audio and/or video data may be stored in the on-chip memory 32 for later playback, where the processing module 30 controls the storing of the data via a multimedia application 46. Note that processing module 30 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The on-chip memory 32 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 30 implements one or more of its functions via a state machine, analog circuitry, digital circuitry, and/or logic circuitry; the memory storing the corresponding operational instructions may be embedded within, or external to, the circuitry comprising the state machine, analog circuitry, digital circuitry, and/or logic circuitry. The memory 32 stores, and the processing module 32 executes, operational instructions corresponding to multimedia applications 46 that include, but are not limited to audio playback, audio record, video playback, video record, storing text, displaying text, storing video graphics, file system transfer, and/or displaying video graphics.

The data that is stored in the on-chip memory 32 may be subsequently retrieved under the control of the processing module 30 while executing a multimedia application 46 to render the data audible and/or visible. In this instance, the processing module 30 causes the data to be retrieved from the on-chip memory 32 and to be provided to the multimedia module 24. The multimedia module 24 processes the data to produce rendered output data 52, which may include analog audio signals, digital audio signals, analog video signals, digital video signals, text, and/or video graphics, and provides the rendered output data 52 to the display 18. The display 18, which may be a headphone jack, a speaker or speakers, a video graphics display, etc., converts the rendered output data 52 into audible and/or visual information.

In other examples, the high-speed interface 28 may exchange audio data, video data, video graphics data, and/or text data with the video decoder 38, the memory card 40, the wireless modem 42, and/or the CMOS/CCD image sensor 44. As such, the multiple function battery operated device 10 may function as a portable MP3 player/recorder, a personal DVD player/recorder, a personal CD player/recorder, etc.

The multimedia module 24 may also receive input signals 54 from the input device 22, which may be a microphone, a keypad, an image capture device (e.g., a digital camera or a digital camcorder), etc. Such input signals 54 may be video signals, audio signals, video graphics signals, and/or text signals. Upon receiving the input signals 54, the multimedia module 24, in conjunction with the processing module 30 executing a multimedia application, converts the input signals 54 into the generic digital format of the system-on-a-chip for storage in the on-chip memory or for providing to an external source via the high-speed interface 28.

As one of average skill in the art will appreciate, the system-on-a-chip may include a memory interface operably coupled to the bus 25 for interfacing with an external flash memory, or the like, which extends the available memory of the battery operated device 10. As such, in one embodiment, all of the video, video graphics, text, and/or audio data is stored in the on-chip memory and in another embodiment, the video, video graphics, text, and/or audio data is at least partially stored off-chip in the external memory and retrieved when needed.

As one of average skill in the art will further appreciate, when the handheld device 10 is not coupled to the host device, (i.e., it is in a battery powered mode) the processing module 30 executes a multimedia application 46 to detect the disconnection and to place the handheld device in a battery operation mode. In the battery operation mode, the processing module 30 retrieves, and subsequently executes, a set of operational instructions from the on-chip memory 32 to support the battery operational mode. For example, the battery operational mode may correspond to audio file playback (including MP3files), digital voice recorder recording, video file playback (including MPEG files and JPEG files), video recording, text messaging display, cellular telephone functionality, and/or AM/FM radio reception.

As one of average skill in the art will still further appreciate, due to the comprehensiveness of the system-on-a-chip 12, the battery-operated device 10 requires a minimal of additional components, thus reducing cost and complexity of the resulting device 10. Further, by including battery-optimizing techniques, the system-on-a-chip optimally consumes power to fully extend the life of the battery.

Figure 2:
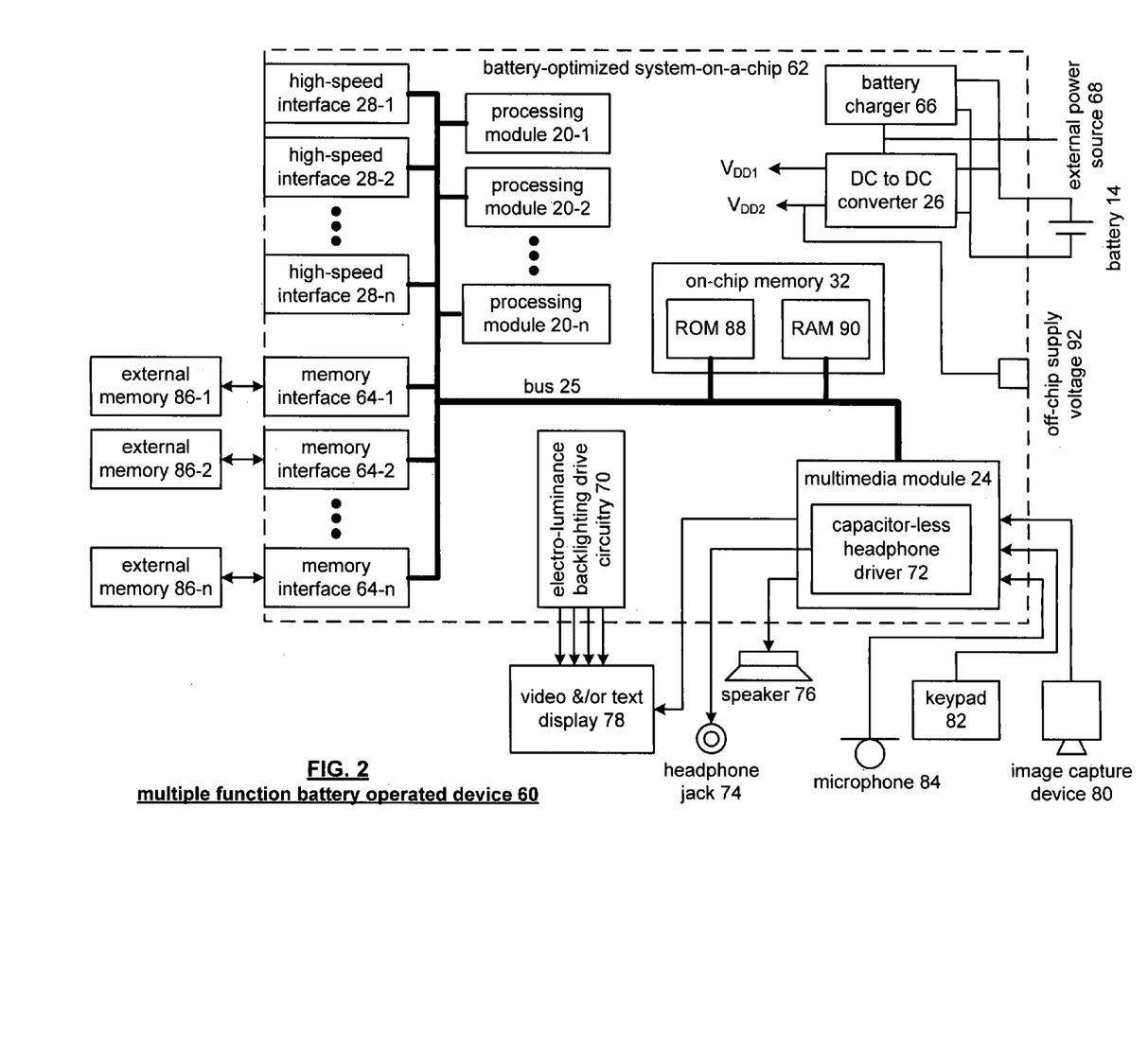
FIG. 2 is a schematic block diagram of another multiple function battery operated device that includes a battery-optimized system-on-a-chip in accordance with the present invention.

FIG. 2 is a schematic block diagram of another multiple function battery operated device 60 that includes a battery-optimized system-on-a-chip 62, a plurality of external memories 86, the battery 14, an external power source 68, a video and/or text display 78, a headphone jack 74, speaker(s) 76, a microphone 84, a keypad 82, and an image capture device 80. The battery-optimized system-on-a-chip 62 includes a plurality of high-speed interfaces 28, a plurality of memory interfaces 64, a plurality of processing modules 30, the DC-to-DC converter 26, a battery charger 66, the on-chip memory 32, the multimedia module 24, and a electro-luminance backlighting drive circuitry 70. The multimedia module 24 includes a capacitor-less headphone driver 72. The on-chip memory 32 includes random access memory (RAM) 90 and read only memory (ROM) 88 and/or on-chip flash memory.

The plurality of high-speed interface 28-1 through 28-n allow the system-on-a-chip 62 to be simultaneously coupled to multiple external sour interfaces may utilize the same or different interface protocols. For example, all of the high-speed interfaces 28 may utilize a USB interface protocol, an Ethernet interface protocol, a FireWire interface protocol, a serial/deserial interface protocol, etc. Alternatively, each high-speed interface 28-1 through 28-n may use a different interface protocol. For instance, high-speed interface 28-1 may support a USB interface, high-speed interface 28-2 may support Ethernet, and high-speed interface 28-n may support a FireWire interface. One or more of the processing modules 30-1 through 30-n coordinates and arbitrates the high-speed interfaces 28 access to the bus 25.

The plurality of memory interfaces 64-1 through 64-n allow the system-on-a-chip 62 to be coupled to a plurality of external memory devices 86-1 through 86-n. The external memory devices 86-1 through 86-n may be NAND flash memory devices, NOR flash memory devices, and/or any other type of random access memory devices or read only memory devices. While executing one or more multimedia applications, one or more of the processing modules 30 coordinates the reading and/or writing of multimedia data to and from the external memory devices 86. For instance, one of the external memory devices 86 may store audio files, (e g., MP3, WMA, etc.) for subsequent playback, another external memory device 86, may store video files (e.g., MPEG, JPEG, etc.) for subsequent playback, and another external memory device may store text and/or video graphics relating to operation of the device 60 and/or related to inputted data via the keypad 82, the image capture device 80, and/or one of the external sources 34.

Each of the external memory devices 86 may or may not be compliant with a memory interface standard. As such the memory interfaces 64 include a flexible topology to accommodate the various types of external memory devices 86 that may be coupled to the system-on-a-chip 62. For a detailed discussion of the functionality of the memory interfaces 64 refer to co-pending patent application entitled FLEXIBLE MEMORY INTERFACE SYSTEM, having a filing date the same as the present patent application, Ser. No. 10/865,585. This co-pending patent application is hereby incorporated by reference.

The multimedia module 24 is operably coupled to receive input signals 54 from a microphone 84, a keypad 82, and/or an image capture device 80. The image capture device 80 may be a digital camera and/or a digital camcorder that supplies MPEG files, JPEG files; and/or other format for still and/or motion digital images. The multimedia module 24 receives the digital video images from the image capture device 80 and either converts them into the generic format of the system-on-a-chip to produce generic video that are stored either in the on-chip memory 32 and/or in the external memory 86 or provides the digital video images to the bus 25 for storage in the on-chip memory 32 and/or in the external memory 86. One or more of the processing modules 30 coordinates the storing of the digital video images and whether the data will be converted to the generic format or not. The generic format may involve portioning packets of the video image into data words of a size corresponding to the bus width of the processing modules 30, storage word size of the on-chip or off-chip memory, and/or of the bus width of the bus 25.

The multimedia module 24 is also coupled to receive input signals 54 from the keypad 82. The keypad 82 may be a touch screen pad, a keyboard, voice recognition module, and/or any device that produces text messages. The multimedia module 24 receives the text messages from the keypad 82 and either processes them for display on the video and/or text display 78 or for storage in the RAM 90 and/or in the external memory 86. The processing of the text message may involve routing it to the video and/or text display 78, converting it to the generic format for storing in the RAM 90 or the external memory 86, or rendering it for display (i.e., converting text information into pixel information).

The multimedia module 24 is further coupled to receive input signals 54 from the microphone 84. The multimedia module 24 converts the analog audio input signals from the microphone 84 into digital audio input signals using an encoding scheme, such as pulse code modulation (PCM). The multimedia module 24 provides the digital audio signals to the RAM 90 and/or the external memory 86 for storage under the control of the processing module 30, which is executing an audio recording multimedia application 46. Accordingly, in this mode, the multiple function battery operated device 60 may function as a voice recorder.

The multimedia module 24 is operably coupled to provide analog audio signals to the speaker(s) 76 and/or to the headphone jack 74. The multimedia module 24 may generate the analog audio signals by performing a PCM decoding of digital audio signals stored in the on-chip memory 32 and/or stored in the external memory 86. The multimedia module 24 includes a driver, or multiple drivers, to supply the analog audio signals to the speaker(s) 76. The multimedia module 24 also includes the capacitor-less headphone driver 72 to supply the analog audio signals to the headphone jack. The capacitor-less headphone driver 72, which will be described in greater detail with reference to FIGS. 6 and 7, reduces the number of external components by eliminating the need for coupling capacitors from the on-chip drivers to the headphone jack, wherein the coupling capacitors enabled level shifting of the analog audio signals from the driver level of 0.9 volts (e.g., AC ground for the left channel and right channel drivers for a 1.8 volt supply voltage) to 0 volts for the headphones. By reducing the number of required external components, the cost of producing a device 10 is reduced without sacrificing features and/or functionality.

The multimedia module 24 is further coupled to the video and/or text display 78, which may be an LCD display, or any other type of display that displays text, video graphics, and/or video images (still or motion). The multimedia module 24 receives digital video data from the on-chip memory and/or the external memory 86 under the control of the processing module 30 which is executing a text and/or video playback multimedia application. Upon receiving the digital video data, the multimedia module 24 converts it into pixel information (e.g., RGB, YUV, YCrCb, etc.), which is provided to the display 78.

If the display 78 includes an electro-luminance backlight, the system-on-a-chip includes the electro-luminance backlighting drive circuitry 70, which will be described in greater detail with reference to FIG. 8. In general, the electro-luminance backlighting drive circuitry 70 provides the control signals for the power transistors of the electro-luminance backlight, thus eliminating the need for an extra integrated circuit to generate the control signals. By eliminating the need or an extra integrated circuit, the cost of producing a device 10 is reduced without sacrificing features and/or functionality.

The battery charger 66 is operably coupled to charge the battery 14 when the external source 68 is coupled to the device 10. The external source 68 may be a 5 volt supply that is received via a USB connection to a host computer or other external source. The details of the battery charger 66 are described in co-pending patent application entitled TBD, having the same filing date as the present patent application, Ser. No. 10/865,585 and co pending patent application entitled TBD, having the same filing date as the present patent application, Ser. No. 10/675,101.

Each of the processing modules 30-1 through 30-n may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Further, each of the processing modules may be performing separate multimedia applications and/or co-process a single multimedia application. Such multimedia applications 46 include, but are not limited to, audio playback, audio record, video playback, video record, storing text, displaying text, storing video graphics, file system transfer, bit manipulations, debugging operations, and error correcting algorithms (e.g., a Reed-Solomon), encryption/decryption algorithms (e.g. DES), encoding/decoding algorithm to encode and/or decode data, and/or displaying video graphics.

The on-chip memory 32 is shown to include ROM 88 and RAM 90. The ROM 88 may store a boot algorithm to initiate the battery-optimized system-on-a-chip 62, video graphics data, and/or any other system level data that should not be overwritten. The RAM 90 may be used as a first and/or second level cache memory for the processing modules 30 and may range from a few hundred kilobits to several hundreds megabits of storage capacity.

The DC-to-DC converter 26 is operably coupled to the battery 14 and inductor 16 to produce at least one supply voltage ($V_{DD}$) In general, the DC-to-DC converter produces multiple supply voltages. The DC-to-DC converter 26 provides a first supply voltage to the processing module 30, the on-chip memory 32, the high-speed interface 28, and/or the multimedia module 24. The DC-to-DC converter 26 may also provide a second supply voltage 92 off-chip to the display 18 and/or to the input device 22. As one of average skill in the art will appreciate, the off-chip supply voltage may be the same as the on-chip supply voltage, depending upon the supply needs of the chip and of the device.

Figure 3:
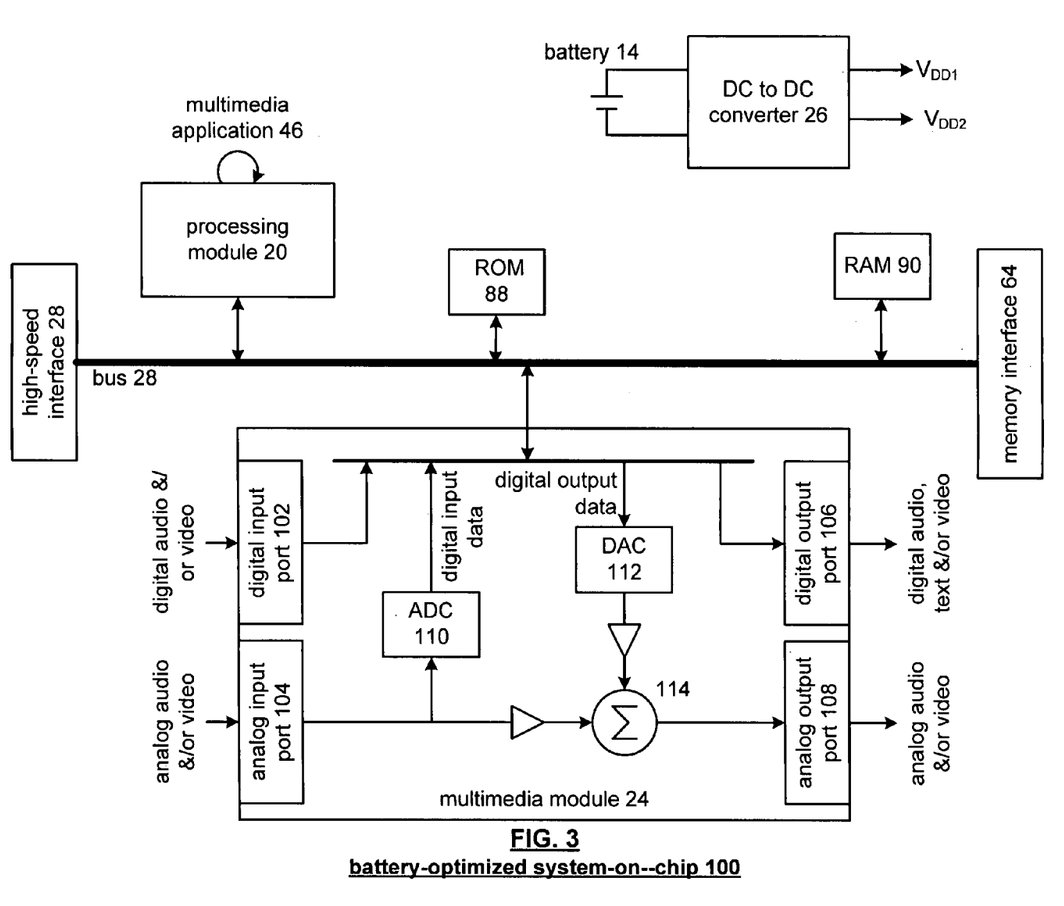
FIG. 3 is a schematic block diagram of a battery-optimized system-on-a-chip in accordance with the present invention.

FIG. 3 is a schematic block diagram of a battery-optimized system-on-a-chip 100 that includes the high-speed interface 28, the processing module 30, the DC-to-DC converter 26, RAM 90, ROM 88, the memory interface 64, the bus 25 and the multimedia module 24. The DC-to-DC converter 96 may produce a first and second output voltage ($V_{DD1}$ and $V_{DD2}$), respectively. Typically $V_{DD1}$ will be greater that $V_{DD2}$, where $V_{DD1}$ is used to source analog sections of the processing module 20, the host interface 18, the memory interface 22, and/or the multimedia module 22 and $V_{DD2}$ is used to source the digital sections of these modules.

The multimedia module 24 includes an analog input port 104, an analog to digital converter (ADC) 110, an analog output port 108, a digital to analog converter (DAC) 112, a digital input port 102, a digital output port 106, and an analog mixing module 114. The analog input port 104 is operably coupled to receive analog input signals from one or more sources including a microphone, an AM/FM tuner, a line in connection (e.g., headphone jack of a CD player), etc. The received analog signals are provided to the ADC 110, which produces digital input data therefrom. The digital input data may be in a pulse code modulated (PCM) format and stored as such, or it may be provided to the processing module 30 for further audio processing (e.g., compression, MP3 encoding, etc.) The digital input data, or the processed version thereof, is stored in memory 90 and/or in the external memory 86 as instructed by the processing module 30.

The digital input port 102 is operably coupled to receive digital audio and/or video input signals from, for example, a digital camera, a camcorder, etc. The digital audio and/or video input signals may be stored in RAM 90 and/or external memory 86 under the control of the processing module 30. As one of average skill in the art will appreciate, the audio and/or video data (which was inputted as analog signals or digital signals) may be stored as raw data (i.e., the signals received are stored as is in designated memory locations) or it maybe stored as processed data (i.e., compressed data, MPEG data, MP3 data, WMA data, etc.).

The DAC 112 receives digital output data from the RAM 90, the external memory 86 via the memory interface 64, and/or from the high-speed interface 28 and converts it into analog video output data and/or analog audio output data that is provided to the mixing module 114 or to the analog output port 108. When the output of the DAC 112 is the only input to the mixing module 114, the mixing module 114 outputs the analog video and/or audio output data to the analog output port 108. The analog output port 108 may be coupled to one or more of the speaker, headphone jack, and a video display. The mixing module 114 may mix analog input signals received via the analog input port 104 with the output of DAC 112 to produce a mixed analog signal that is provided to the analog output port 108. Note that the buffers in series with the inputs of the mixing module 114 may have their gains adjusted and/or muted to enable selection of the signals at various gain settings provided to the mixing module 114 and subsequently outputted via the analog output port 108.

The digital output port 106 is operably coupled to output the digital output data (i.e., the multimedia data in a digital format). The digital output port 106 may be coupled to a digital input of a video display device, another handheld device for direct file transfer, etc.

As one of average skill in the art will appreciate, the multimedia module 24 may include more or less components than the components shown in FIG. 3 or include multiple analog and/or digital input and/or output ports. For example, for a playback mode of digital audio files, the multimedia module 24 may only include the DAC 112 and the analog output port 108 that is coupled to the headphone jack and/or to the s speaker. As another example, for recording voice samples (i.e., as a digital voice recorder), the multimedia module 24 may include the analog input port 104 coupled to the microphone and the ADC.

Figure 4:
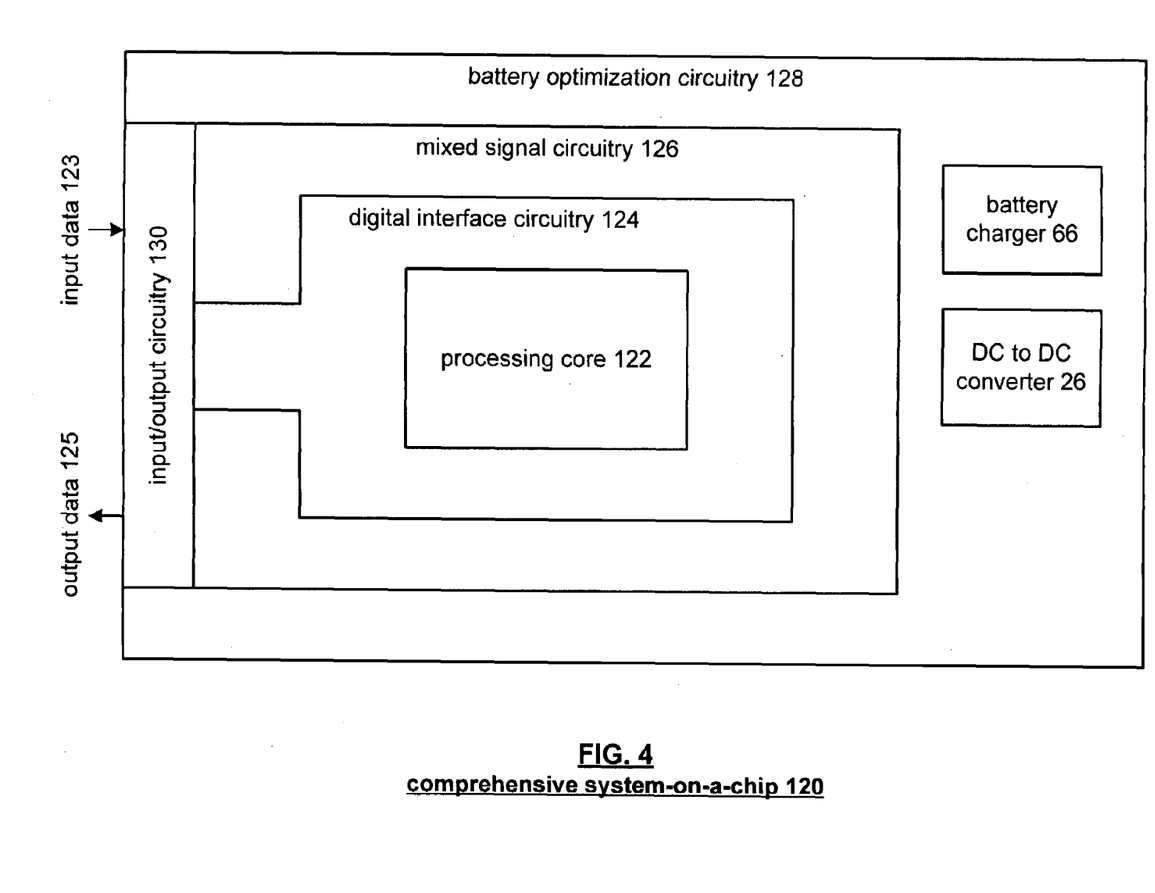
FIG. 4 is a schematic block diagram of a comprehensive system-on-a-chip in accordance with the present invention.

FIG. 4 is a schematic block diagram of a comprehensive system-on-a-chip 120 that includes a processing core 122, digital interface circuitry 124, mixed signal circuitry 126, battery optimization circuitry 128, and input/output circuitry 130. The battery optimization circuitry 128 includes a DC-to-DC converter 26 and a battery charger 66. The processing core 122 includes one or more processing modules, where a processing module is a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The processing core 122 can be programmed to provide one of a plurality of battery-operated device functions, including, but not limited to, video signal processing, audio signal processing, text processing and/or video graphics processing.

The digital interface circuitry 114 is operably coupled to the input/output circuitry 130 such that digital input and output signals may be conveyed on and off-chip via the input/output circuitry 130. The digital circuitry 130 includes logic gates, memory, etc. to prepare digital inputs for processing by the processing core and to prepare processed data by the processing core 122 for outputting via the input/output circuitry 130. The mixed signal circuitry 126 includes digital to analog converters, analog to digital converters, analog circuitry, etc. for preparing analog signals for processing by the processing core and to prepare data processed by the processing core for outputting as analog signals via the input/output circuitry 130.

The battery optimization circuitry 128 includes the DC-to-DC converter 26 and the battery charger 66. In general, the battery optimization circuitry 128 includes circuitry to optimize the life of a battery. Such circuitry is described in detail in co-pending patent application entitled, CONSERVING POWER OF A SYSTEM ON A CHIP USING AN ALTERNATE POWER SOURCE, having a filing date the same as the present patent application, Ser. No. 10/607,948 and co-pending patent application entitled CONSERVING POWER OF A SYSTEM ON A CHIP USING SPEED SENSING, having a filing date the same as the present patent application, Ser. No. 10/607,960. Further battery optimizing/managing circuitry includes temperature measurement circuitry, voltage measurement circuitry, energy usage monitoring circuitry, and such circuitry as is described in co-pending patent application entitled METHOD AND APPARATUS FOR EFFICIENT BATTERY USE BY A HANDHELD MULTIPLE FUNCTION DEVICE, Ser. No. 10/603,640, and a filing date of Jun. 25, 2003.

Figure 5:
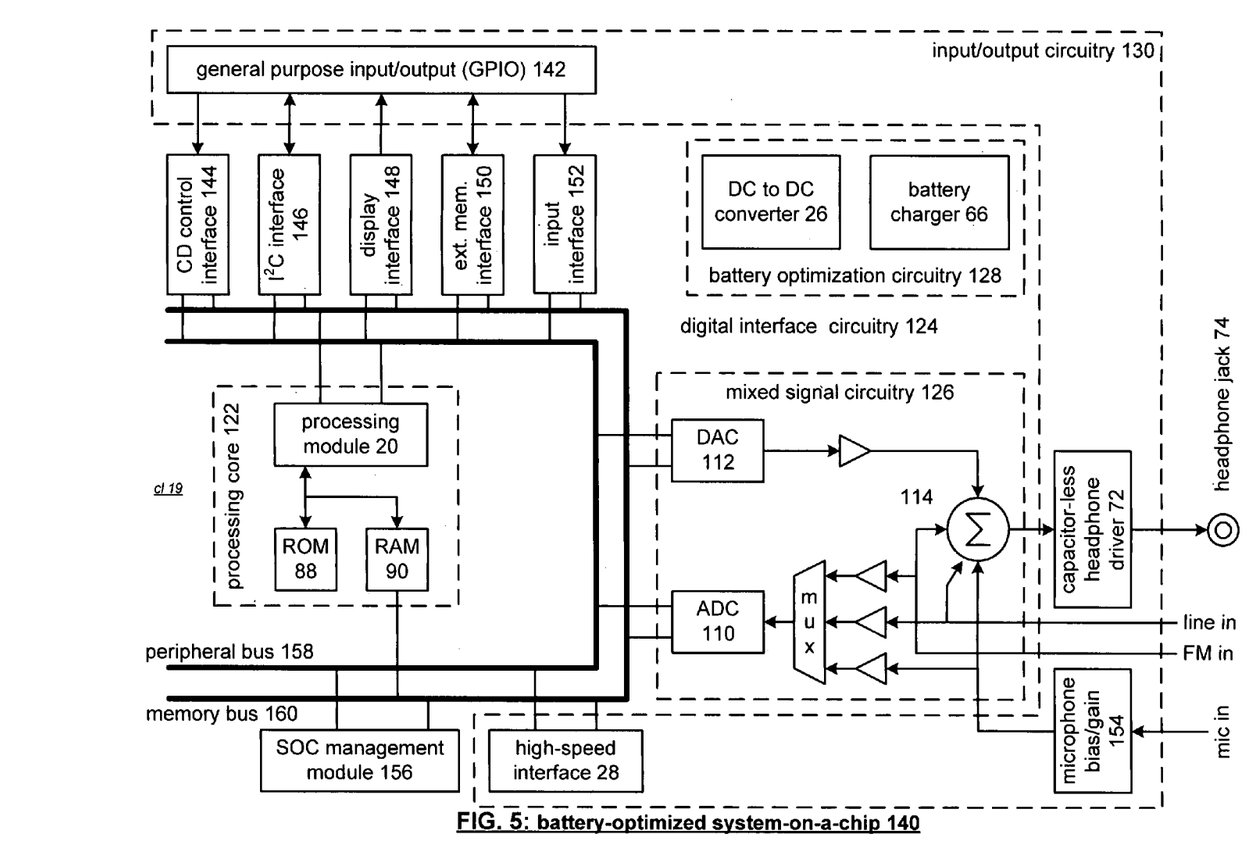
FIG. 5 is a schematic block diagram of another battery-optimized system-on-a-chip in accordance with the present invention.

FIG. 5 is a schematic block diagram of another battery-optimized system-on-a-chip 140 that includes a processing code 122, the digital interface circuitry 124, the mixed signal circuitry 126, the battery optimization circuitry 128, and the input/output circuitry 130. The input/output circuitry 130 includes a general-purpose input/output module 142, the capacitor-less headphone driver 72, a microphone bias circuit 154, and the high-speed interface 28. The battery optimization circuitry 128 includes the battery charger 66 and DC-to-DC converter 26. The digital interface circuitry 124 includes a CD control interface 144, an I²C interface module 146, a display interface module 148, an external memory interface 150, a system-on-a-chip (SOC) management module 156, and an input interface module 152. The processing core includes the processing module 30, ROM 88 (or ROM/flash memory), and RAM 90. The mixed signal circuitry 126 includes a digital-to-analog converter 112, an analog-to-digital converter 110, a multiplexed, buffers, mixing module 114, and a microphone bias/gain module 154. The processing core 122, the digital interface circuitry 124, and the mixed signal circuitry 126 are operably coupled via a peripheral bus 158 and a memory bus 160.

In operation, the battery-optimized system-on-a-chip 140 may facilitate the transceiving of data with an external source and a multi-function handheld device for playback of multimedia data, and/or for recording multimedia data. When the battery-optimized system-on-a-chip 140 is transceiving with an external source, the high-speed interface 28 operably couples the battery-optimized system-on-a-chip 140 to the external source. In addition, the external memory interface 150 couples, either via the general-purpose input/output module 142 or directly, to system memory (e.g., external memory 86) of the multi-function handheld device 10. In this configuration, data that is received from the host device is placed on the memory bus 160 by the high-speed interface 28. The external memory interface 150 retrieves the data from the memory bus 160 and forwards it for storage to the external memory under the control of the processing module 30 that is executing a file system storage algorithm. The data being stored may correspond to playback data, such as MP3 file, a WMA file, a video file, a text file, and/or a combination thereof. Alternatively, or in addition to, the data being received from the external source may correspond to programming instructions of a multimedia application 46, which may be an MP3 decoder algorithm, a WMA decoder algorithm, a MPEG algorithm, a JPEG algorithm, et cetera.

For providing data from the handheld device 10 to the external source, the external memory interface 150 retrieves data from the external memory 86 and places it on the memory bus 160 under the control of the processing module 30 as it executes a file system algorithm. The high-speed interface 28 retrieves the data from the memory bus 160 and forwards it to the external source.

Data may also be stored in the external memory 86 that is received via the CD (compact disk) control interface 144 which can receive data via a CD or a DVD disk, the I²C interface 146, and/or any other type of multiple wire data interface. Via these interfaces 144 and 146, data is received via the general-purpose input/output module 142 and placed on the memory bus 106. The external memory interface 150 retrieves the data from the memory bus 160 and provides it to the external memory 86, which is done under the control of the processing module as it executes a data storage algorithm.

When the battery-optimized system-on-a-chip 140 is recording audio inputs received via the microphone input the microphone bias/gain circuit 154 amplifies received audio signals and provides them to the mixing module 114 as well as to the multiplexer (mux) via a buffer. The microphone bias/gain circuit 154 also provides a bias to the microphone for optimal operation of the microphone. The received audio input signals are converted to digital audio signals via the analog-to-digital converter 110. The digital audio signals may then be stored in external memory 86. Alternatively, the audio input signal may be provided to the summing module 114 and subsequently provided to headphone jack 74 via a driver that is coupled to the output of the summing module 114. The summing module 114 may sum, or pass any one of the audio input signals, such as a line input, an FM radio input, and the analog output of the DAC 72, to produce the summed signal.

When the battery-optimized system-on-a-chip 140 is in a playback mode, digital multimedia data is retrieved from memory (e.g., on-chip or external memory) and provided to the digital-to-analog converter 112. The digital-to-analog converter 112 converts the digital multimedia signals, which may be audio data, video data and/or text data, into analog multimedia signals and provides the analog multimedia signals to mixing module 114. In the playback mode, the mixing module 114 will generally have the other inputs muted, such that its output corresponds directly to the analog multimedia signals provided by the digital-to-analog converter 112.

To place the battery-optimized system-on-a-chip 140 into the various operational modes, commands are received via the general purpose input/output module 142 by the input interface 152. The input interface 152 receives the input stimulus corresponding to commands (e.g., fast forward, pause, reverse play, time, record, etc.), interprets the input stimulus to generate the corresponding commands. The commands are then provided on the peripheral bus 158 and/or the memory bus 160 and processed by the processing module 30.

In addition to producing audio outputs during playback mode, the battery-optimized system-on-a-chip 140 may provide video outputs via the display interface 148. The display interface 148 drives the display, which may be an LCD display, LED display, plasma display, and/or any other type of display. The data being displayed may correspond to the multimedia data retrieved from memory, and/or may correspond to the commands inputted via the input interface 152.

The system-on-a-chip (SOC) management module 156 processes interrupt controls, setting and/or monitoring of DC-to-DC converter supply voltages, setting and/or monitoring of clock speeds configuring analog circuitry, monitoring temperatures, performing battery status measurements, managing battery charging, controlling audio volumes, etc.

Figure 6:
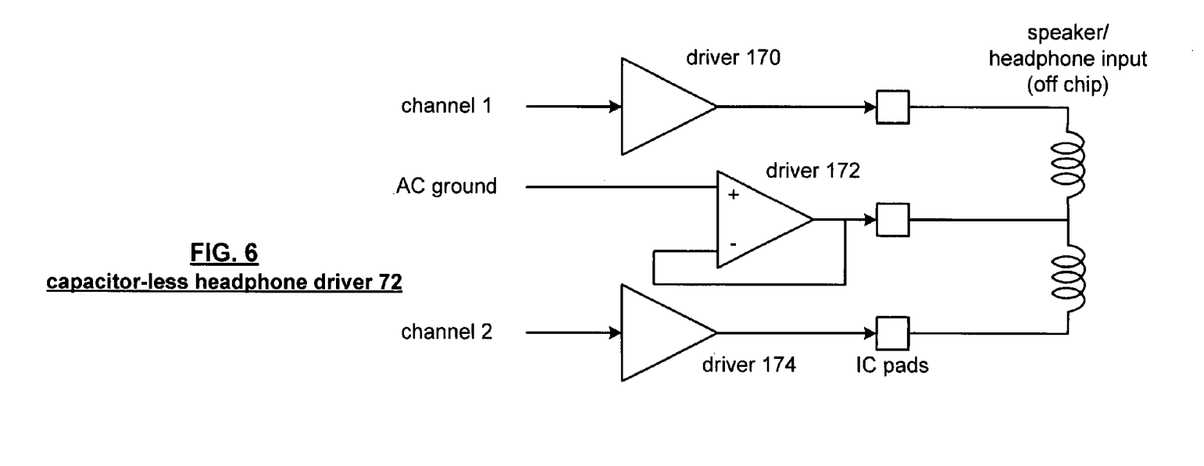
FIG. 6 is a schematic block diagram of a capacitor-less headphone driver in accordance with the present invention.

FIG. 6 is a schematic block diagram of a capacitor-less headphone driver 72 that includes a first line driver 170, a second line driver 174, and an AC ground line driver 172. The outputs of the line driver 170-174 are coupled to IC pads, which couple to the input of headphones or speakers. The input section of the headphones/speakers includes two channels, which are illustrated as inductors. The first channel is coupled to the output of the first line driver 170, which may be driving a left channel signal of a stereo signal, and the output of the AC ground line driver 172. The second channel is coupled to the output of the second line driver 174, which may be driving a right channel signal of a stereo signal, and the output of the AC ground line driver 172. As is further shown, the AC ground line driver 172, which may be implemented as a unity gain amplifier, has its inverting input tied to the output within the chip.

In this configuration, the amplifiers that generate the left and right channel signals may be biased at one-half the supply voltage, which may be 0.9 volts for a 1.8 volt supply. As such, the left and right channel signals are biased at one-half the supply voltage, which corresponds to AC ground for the signals. By providing the AC ground to the headphones, the headphones are coupled to the AC ground as opposed to DC ground. Thus, eliminating the need for large off-chip capacitors to level shift the left and right channel signals. The AC ground line driver 172 may include circuitry to detect whether it is coupled to a DC ground. If the circuitry detects a DC ground connection, it generates a signal indicating the connection, which enables firmware of the system-on-a-chip to active an overload protection algorithm as disclosed in co-pending patent application entitled METHOD AND APPARATUS FOR EFFICIENT BATTERY USE BY A HANDHELD MULTIPLE FUNCTION DEVICE, Ser. No. 10/603,640, and a filing date of Jun. 25, 2003.

Figure 7:
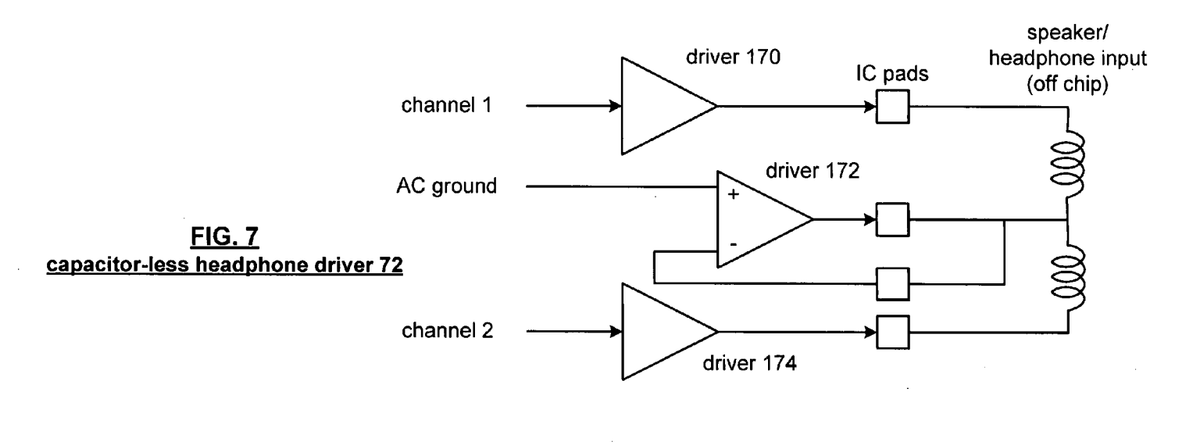
FIG. 7 is a schematic block diagram of another capacitor-less headphone driver in accordance with the present invention.

FIG. 7 is a schematic block diagram of another capacitor-less headphone driver 72 that includes the first channel driver 170, the AC ground driver 172, and the second channel driver 174, wherein each of the outputs of the drivers 170–174 to corresponding IC pads. This embodiment differs from the one of FIG. 6 in that the unit gain feedback for the AC ground driver 172 is coupled externally via another IC pad. This enables the AC ground to be a more stable signal as seen by the input section of the headphones than the AC ground provided by the circuit of FIG. 6.

Figure 8:
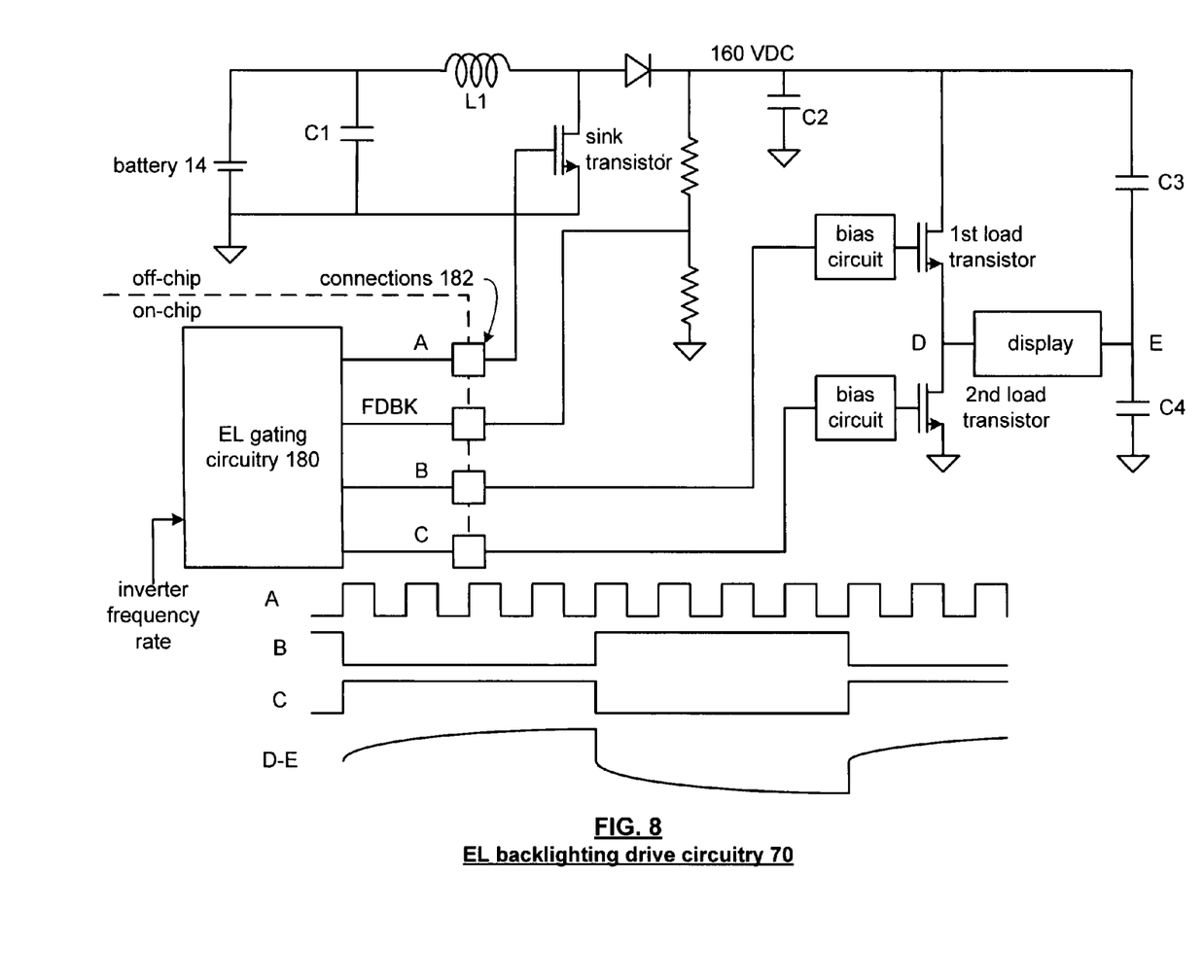
FIG. 8 is a schematic block diagram of an elector luminance drive circuit in accordance with the present invention.

FIG. 8 is a schematic block diagram of an electro luminance backlight drive circuit 70 that includes electro-luminance (EL) gating circuitry 180 and IC pad connections. The EL gating circuitry 180 generates the signals A, B and C. In one embodiment, signal A may be generated based on a feedback signal (FDBK) and signals B and C based on an inverter frequency rate. In another embodiment, signals A, B, and C may be generated based on a desired timing relationship and known external component values. In general, the EL power circuit is an off-chip inverter that converts a battery voltage into a high voltage AC signal (e.g., 160-volt peak-to-peak AC signal) at a given frequency, which is established by the inverter frequency rate. The inverter includes a capacitor (C1), an inductor (L1), a sink transistor, a diode, two load transistors, a load capacitor (C2), two high voltage reference capacitors (C3 and C4), and feedback circuitry. In this configuration, signal A drives the sink transistor based on the feedback signal to regulate, for example, a 160 volts DC. Note that the regulation signal may be omitted and signal A may be generated to drive the sink transistor to produce an unregulated 160 VDC supply. Signal B drives the first load transistor via a bias circuit and signal C drives the second load transistor via another bias circuit to produce the 160 volt AC drive, as shown by signal D-E. By including the EL gating circuitry 180 on-chip, the external part count of a battery operated multiple function device is reduced, since a separate integrated circuit is not needed to produce the drive signals A, B, and C.

As one of average skill in the art will appreciate, the term "substantially" or "approximately", as may be used herein provides an industry-accepted tolerance to its corresponding term. Such an industry accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltages level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has present a battery-optimized system-on-a-chip that reduced power consumption and reduces the bill of materials for a multiple function battery operated device, such as an MP3 player. As one of average skill in the art will appreciate, other embodiments may be derived from the teachings of the present invention without deviating from the scope of the claims.

What is claimed is:

1. A battery-optimized system-on-a-chip comprises:
   multimedia module operably coupled to produce rendered output data;
   high-speed interface;
   processing module;
   on-chip memory operably coupled to store at least a portion of a multimedia application, wherein the processing module processes input multimedia data in accordance with the at least the portion of the multimedia application to produce output multimedia data, wherein the input multimedia data is received from at least one of the multimedia module and the high-speed interface, and wherein the output multimedia data is provided to at least one of the multimedia module arid the highspeed interface; and
   on-chip DC-to-DC converter operably coupled to convert a battery voltage into a supply voltage, wherein the DC-to-DC converter provides the supply voltage to at least one of the multimedia module, the highspeed interface, the processing module, and the on-chip memory.

2. The battery-optimized system-on-a-chip of claim 1, wherein the on-chip memory is further operably coupled to provide at least a portion of the input multimedia data and is further operably coupled to receive at least a portion of the output multimedia data.

3. The battery-optimized system-on-a-chip of claim 1 further comprises:
   a memory interface operably coupled to provide at least a portion of the output multimedia data to external memory and to receive at least a portion of the input multimedia data from the external memory.

4. The battery-optimized system-on-a-chip of claim 3 further comprises a plurality of memory interfaces operably coupled to provide a plurality of output multimedia data to a plurality of external memories and to receive a plurality of input multimedia data from the plurality of external memories, wherein the plurality of memory interfaces include the memory interface, wherein the plurality of external memories includes the external memory, the plurality of output multimedia data includes the at least a portion of the output multimedia data, and the plurality of input multimedia data includes the at least a portion of the input multimedia data.

5. The battery-optimized system-on-a-chip of claim 1 further comprises a plurality of processing modules operably coupled to perform a plurality of multimedia applications, wherein the plurality of processing modules includes the processing module.

6. The battery-optimized system-on-a-chip of claim 1 further comprises a plurality of high speed interfaces operably coupled to provide a plurality of input multimedia data to the processing module from a plurality of external sources and to provide a plurality of output multimedia data to the plurality of external sources, wherein the plurality of high speed interfaces includes the high-speed interface, the plurality of input multimedia data includes the input multimedia data, and the plurality of output multimedia data includes the output multimedia data.

7. The battery-optimized system-on-a-chip of claim 6, wherein each of the plurality of external sources comprises at least one of: a host computer, a video decoder, memory card, removable memory drive, a wireless modem, and a CMOS/CCD image sensor.

8. The battery-optimized system-on-a-chip of claim 1, wherein each of the input and output multimedia data further comprises at least one of: digital audio, analog audio, digital video, analog video, text, and video graphics.

9. The battery-optimized system-on-a-chip of claim 1 further comprises a battery charger operably coupled to charge a battery that provides the battery voltage when an external power source is coupled to the battery-optimized system-on-a-chip.

10. The battery-optimized system-on-a-chip of claim 1, wherein the highspeed interface further comprises a universal, serial bus compliant interface.

11. The battery-optimized system-on-a-chip of claim 1, wherein the multimedia module produce tho rendered output data from the output multimedia data, the multimedia module further comprises:
 a capacitor-less headphone driver operably coupled to provide at least a portion of the rendered output data to a pair of headphones, wherein the capacitor-less headphone driver includes:
  a first channel driver;
  a second channel driver; and
  an AC ground channel driver, wherein the first channel driver drives a first channel of the pair of headphones with a return via the AC ground channel driver and wherein the second channel driver drives a second channel of the pair of headphones with a return via the AC ground channel driver.

12. The battery-optimized system-on-a-chip of claim 11, wherein the capacitor-less headphone driver further comprises:
 a first channel integrated circuit (IC) pad operably coupled to the first channel driver;
 a second channel IC pad operably coupled to the second channel driver;
 an AC ground IC pad operably coupled to the AC ground channel driver; and
 a unit gain feedback IC pad operably coupled to provide a unity gain feedback for the AC ground channel driver.

13. The battery-optimized system-on-a-chip of claim 1 further comprises:
 an electro-luminance backlighting drive circuitry operably coupled to at least partially power a backlight to a display that is displaying at least a portion of the output multimedia data to, wherein the electro-luminance backlighting drive circuitry includes:
  a sink transistor connection;
  a first load transistor connection;
  a second load transistor connection:
  gating circuitry operably coupled to enable a sink transistor operably coupled to the sink transistor connection to sink energy from an external inductor and to enable one of first and second load transistors operably coupled to the first and second load transistor connections to draw energy from a second external inductor to provide an electro-luminance backlighting drive voltage.

14. The battery-optimized system-on-a-chip of claim 1, wherein the DC-to-DC converter is further coupled to provide the supply voltage off-chip.

15. The battery-optimized system-on-a-chip of claim 1, wherein the on-chip memory further comprises at least one of flash memory, read only memory, and random access memory.

16. The battery-optimized system-on-a-chip of claim 1, wherein the multimedia module further functions to provide the rendered output data to at least one of: headphones, a speaker, and a video graphics display, and wherein the multimedia module further functions to receive input signals from at least one of: a keypad, a keyboard, an image capture device, and a microphone, wherein the multimedia module processes the input signals to produce the input multimedia data.

17. A comprehensive system-on-a-chip comprises:
 a processing core operably coupled to process input digital data and produce therefrom output digital data;
 digital interface circuitry operably coupled to provide the input digital data to the processing core and to receive the output digital data from the processing core;
 mixed signal circuitry operably coupled to convert input analog signals into at least some of the input digital data and to convert at least some of the output digital data into output analog signals; and
 battery optimization circuitry that includes a DC-to-DC converter and a battery charger, wherein the DC-to-DC converter is operably coupled to convert a battery voltage into a supply voltage that supplies at least one of: the processing core, the digital interface circuitry, and the mixed signal circuitry and the battery charger is operably coupled to charge a battery that generates the battery voltage.

18. The comprehensive system-on-a-chip of claim 17, wherein the processing core further comprises: at least one processing module and on-chip memory, wherein the on-chip memory is operably coupled to store at least a portion of a multimedia application, wherein the at least one processing module processes the input digital data in accordance with the at least the portion of the multimedia application to produce the output digital data.

19. The comprehensive system-on-a-chip of claim 18, wherein the on-chip memory is further operably coupled to provide at least a portion of the input digital data and is further operably coupled to receive at least a portion of the output digital data.

20. The comprehensive system-on-a-chip of claim 17, wherein mixed signal circuitry further comprises:
 a memory interface operably coupled to provide at least a portion of the output digital data to external memory and to receive at least a portion of the input digital data from the external memory.

21. The comprehensive system-on-a-chip of claim 20 further comprises a plurality of memory interfaces operably coupled to provide a plurality of output digital data to a plurality of external memories and to receive a plurality of input digital data from the plurality of external memories, wherein the plurality of memory interfaces include the memory interface, wherein the plurality of external memories includes the external memory, the plurality of output digital data includes the at least a portion of the output digital data, and the plurality of input digital data includes the at least a portion of the input digital data.

22. The comprehensive system-on-a-chip of claim 17 further comprises a plurality of high speed interfaces operably coupled to provide a plurality of input digital data to the processing module from a plurality of external sources and to provide a plurality of output digital data to the plurality of external sources, wherein the plurality of input digital data includes the input digital data and the plurality of output digital data includes the output digital data.

23. The comprehensive system-on-a-chip of claim 22, wherein each of the plurality of external sources comprises at least one of: a host computer, a video decoder, memory card, removable memory driver a wireless modem, and a CMOS/CCD image sensor.

24. The comprehensive system-on-a-chip of claim 17, wherein each of the input and output digital data further comprises at least one of: digital audio, analog audio, digital video, analog video, text, and video graphics.

25. The comprehensive system-on-a-chip of claim 17, wherein the mixed signal circuitry further comprises:
a capacitor-less headphone driver operably coupled to provide at least a portion of the output multimedia data to a pair of headphones, wherein the capacitor-less headphone driver includes:
a first channel driver;
a second channel driver; and
an AC ground channel driver, wherein the first channel driver drives a first channel of the pair of headphones with a return via the AC ground channel driver and wherein the second channel driver drives a second channel of the pair of headphones with a return via the AC ground channel driver.

26. The comprehensive system-on-a-chip of claim 25, wherein the capacitor-less headphone driver further comprises:
a first channel integrated circuit (IC) pad operably coupled to the first channel driver;
a second channel IC pad operably coupled to the second channel driver;
an AC ground IC pad operably coupled to the AC ground channel driver; and
a unit gain feedback IC pad operably coupled to provide a unity gain feedback for the AC ground channel driver.

27. The comprehensive system-on-a-chip of claim 17, wherein the mixed signal circuitry further comprises:
an electro-luminance backlighting drive circuitry operably coupled to at least partially power a backlight to a display that is displaying at least a portion of the output multimedia data to, wherein the electro-luminance backlighting drive circuitry includes:
a sink transistor connection;
a first load transistor connection;
a second load transistor connection;
gating circuitry operably coupled to enable a sink transistor operably coupled to the sink transistor connection to sink energy from an external inductor and to enable one of first and second load transistors operably coupled to the first and second load transistor connections to draw energy from a second external inductor to provide an electro-luminance backlighting drive voltage.

28. The comprehensive system-on-a-chip of claim 17, wherein the DC-to-DC converter is further coupled to provide the supply voltage off-chip.

29. A multiple function battery operated device comprises:
an inductor;
a battery;
a display interface; and
a battery-optimized system-on-a-chip operably coupled to the inductor, the battery, and the display interface, wherein the battery-optimized system-on-a-chip includes:
multimedia module operably coupled to the display interface, wherein the multimedia module generates rendered output data;
high-speed interface;
processing module;
on-chip memory operably coupled to store at least a portion of a multimedia application, wherein the processing module processes input multimedia data in accordance with the at least the portion of the multimedia application to produce output multimedia data, wherein the input multimedia data is received from at least one of the multimedia module and the high-speed interface, and wherein the output multimedia data is provided to at least one of the multimedia module and the high-sped interface; and
on-chip DC-to-DC converter operably coupled to convert a battery voltage provided by the battery in conjunction with the inductor into a supply voltage, wherein the DC-to-DC converter provides the supply voltage to et least one of the multimedia module, the high-speed interface, the processing module, and the on-chip module.

30. The multiple function battery operated device of claim 29, wherein the on-chip memory is further operably coupled to provide at least a portion of the input multimedia data and is further operably coupled to receive at least a portion of the output multimedia data.

31. The multiple function battery operated device of claim 29 further comprises:
a memory interface operably coupled to provide at least a portion of the output multimedia data to external memory and to receive at least a portion of the input multimedia data from the external memory.

32. The multiple function battery operated device of claim 31 further comprises a plurality of memory interfaces operably coupled to provide a plurality of output multimedia data to a plurality of external memories and to receive a plurality of input multimedia data from the plurality of external memories, wherein the plurality of memory interfaces include the memory interface, wherein the plurality of external memories includes the external memory, the plurality of output multimedia data includes the at least a portion of the output multimedia data, and the plurality of input multimedia data includes the at least a portion of the input multimedia data.

33. The multiple function battery operated device of claim 29 further comprises a plurality of processing modules operably coupled to perform a plurality of multimedia applications, wherein the plurality of processing modules includes the processing module.

34. The multiple function battery operated device of claim 29 further comprises a plurality of high speed interfaces operably coupled to provide a plurality of input multimedia data to the processing module from a plurality of external sources and to provide a plurality of output multimedia data to the plurality of external sources, wherein the plurality of high-speed interfaces includes the highspeed interface, the plurality of input multimedia data includes the input multimedia data, and the plurality of output multimedia data includes the output multimedia data.

35. The multiple function battery operated device of claim 34, wherein each of the plurality of external sources comprises at least one of: a host computer, a video decoder, memory card, removable memory drive, a wireless modem, and a CMOS/CCD image sensor.

36. The multiple function battery operated device of claim 29, wherein each of the input and output multimedia data further comprises at least one of: digital audio, analog audio, digital video, analog video, text, and video graphics.

37. The multiple function battery operated device of claim 29 further comprises a battery charger operably coupled to charge a battery that provides the battery voltage when an external power source is coupled to the battery-optimized system-on-a-chip.

38. The multiple function battery operated device of claim 29, wherein the highspeed interface further comprises a universal serial bus compliant interface.

39. The multiple function battery operated device of claim 29, wherein the multi-media module produce the rendered output data from the output multimedia data, the multimedia module further comprises:
a capacitor-less headphone driver operably coupled to provide at least a portion of the rendered output data to a pair of headphones, wherein the capacitor-less headphone driver includes:
a first channel driver;
a second channel driver; and
an AC ground channel driver, wherein the first channel driver drives a first channel of the pair of headphones with a return via the AC ground channel driver and wherein the second channel driver drives a second channel of the pair of headphones with a return via the AC ground channel driver.

40. The multiple function battery operated device of claim 39, wherein the capacitor-less headphone driver further comprises:
a first channel integrated circuit (IC) pad operably coupled to the first channel driver;
a second channel IC pad operably coupled to the second channel driver;
an Ac ground IC pad operably coupled to the AC ground channel driver; and
a unit gain feedback IC pad operably coupled to provide a unity gain feedback for the AC ground channel driver.

41. The multiple function battery operated device of claim 29 further comprises:
an electro-luminance backlighting drive circuitry operably coupled to at least partially power a backlight to a display that is displaying at least a portion of the output multimedia data to, wherein the electro-luminance backlighting drive circuitry includes:
a sink transistor connection;
a first load transistor connection;
a second load transistor connection;
gating circuitry operably coupled to enable a sink transistor operably coupled to the sink transistor connection to sink energy from an external inductor and to enable one of first and second load transistors operably coupled to the first and second load transistor connections to draw energy from a second external inductor to provide an electro-luminance backlighting drive voltage.

42. The multiple function battery operated device of claim 29, wherein the DC-to-DC converter is further coupled to provide the supply voltage off-chip.

43. The multiple function battery operated device of claim 29, wherein the on-chip memory further comprises read only memory and random access memory.

44. The multiple function battery operated device of claim 29, wherein the multimedia module further functions to provide the rendered output data to at least one of: headphones, a speaker, and a video graphics display, and wherein the multimedia module further functions to receive input signals from at least one of: a keypad, a keyboard, an image capture device, and a microphone, wherein the multimedia module processes the input signals to produce the input multimedia data.

45. The multiple function battery operated device of claim 29, wherein the display further comprises at least one of: a headphone jack, a speaker, and a video graphics display.

46. The multiple function battery operated device of claim 29 further comprises an input device operably coupled to the multimedia module, wherein the input device includes at least one of: a microphone, a keypad, a keyboard, and an image capture device.

* * * * *